United States Patent [19]

Sasaki et al.

[11] Patent Number: 4,988,849

[45] Date of Patent: Jan. 29, 1991

[54] FINANCIAL TRANSACTION SYSTEM

[75] Inventors: Shigeru Sasaki, Ibaraki; Masataka Kawauchi, Ishioka; Yasunori Hamada, Tsuchiura, all of Japan

[73] Assignee: Hitachi, Ltd., Tokyo, Japan

[21] Appl. No.: 179,301

[22] Filed: Apr. 8, 1988

[30] Foreign Application Priority Data

Apr. 10, 1987 [JP] Japan ................... 62-86865

[51] Int. Cl.⁵ .................. G06F 15/30; G06K 7/00
[52] U.S. Cl. .................... 235/379; 235/380;
    235/383; 902/10; 902/24; 364/407; 340/825.33
[58] Field of Search ............ 235/375, 379, 380, 381,
    235/383; 902/8, 9, 10, 20, 24; 340/825.33,
    825.34, 825.35; 364/478, 479, 401, 407, 408

[56] References Cited

U.S. PATENT DOCUMENTS

| | | | |
|---|---|---|---|
| 4,442,346 | 4/1984 | Bösinger et al. | 235/379 |
| 4,620,087 | 10/1986 | Aizaki | 902/10 |
| 4,635,053 | 1/1987 | Banks et al. | 340/825.31 |
| 4,697,708 | 10/1987 | Goto et al. | 902/10 |
| 4,721,045 | 1/1988 | Okawa et al. | 902/10 |
| 4,767,917 | 8/1988 | Ushikubo | 235/380 |
| 4,775,783 | 10/1988 | Sasaki et al. | 235/379 |
| 4,833,312 | 5/1989 | Minematsu et al. | 235/379 |

FOREIGN PATENT DOCUMENTS 57-178558 11/1982 Japan .
57-189267 11/1982 Japan .
88/06771 9/1988 World Int. Prop. O. ......... 235/381

Primary Examiner—Stuart S. Levy
Assistant Examiner—Robert A. Weinhardt
Attorney, Agent, or Firm—Antonelli, Terry, Stout & Kraus

[57] ABSTRACT

A transaction processing system which includes apparatus for accepting a precontract including the amount of payment/deposit and delivery time of payment/deposit, cash counting apparatus for counting cash, a payment/deposit processing apparatus to be manipulated by the user at the time of payment/deposit on the basis of the user's precontact, delivery apparatus for delivering a medium such as cash and bonds precontracted by the user, transfer apparatus for transferring the medium for the payment/deposit precontract between the cash counting apparatus and the delivery apparatus, and control apparatus for activating the system on the basis of the precontract data of the user. A payment/deposit precontract from a user is accepted via a public telephone line or a data communication network, a medium delivered to the delivery apparatus is prepared in view of other payment precontracts and the time of the visit of the user to the transaction processing system.

6 Claims, 11 Drawing Sheets

F I G. 5
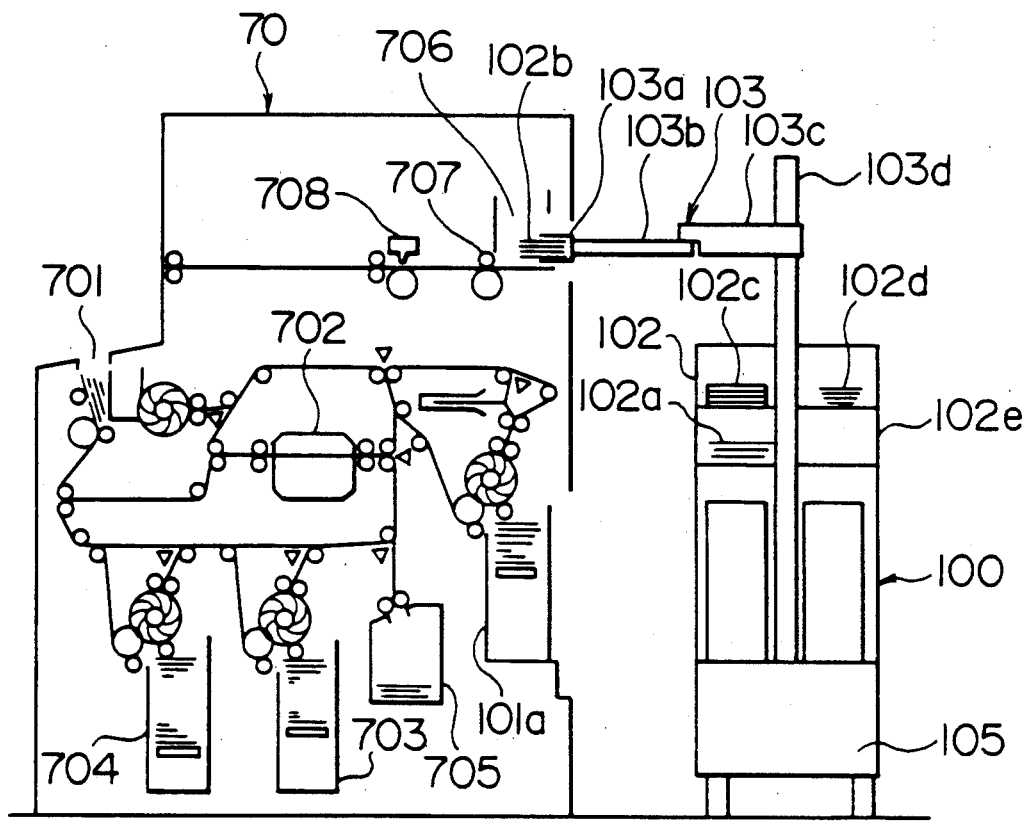

FINANCIAL TRANSACTION SYSTEM

BACKGROUND OF THE INVENTION

1. FIELD OF THE INVENTION

The present invention relates to a transaction processing system of a transaction medium such as cash or a bond, and in particular to a transaction processing system for receiving transaction processing means such as payment and/or deposit precontract from a customer.

2. DESCRIPTION OF THE RELATED ART

In conventional payment/deposit manipulation, a user manipulates a cash handling apparatus for drawing money for oneself by using a cash card. Instead of such apparatuses, there are automated cash dispensers as disclosed in Japanese patent unexamined publication No. JP-A-57-178558, for example. In this case, a payment request is registered beforehand by a telephone precontract, the precontractor receives cash by only inserting a cash card into a cash handling apparatus.

For such a cash handling apparatus of the prior art, the user exchanges information with a main apparatus beforehand by using a telephone line and registers a cash-card secret identification number, a deposit account number, the amount of payment and the like. As for the receipt of cash, the precontractor must go to the bank and slip the card into a cash dispenser to receive the money.

At the time of cash receipt, therefore, the precontractor receives cash by using a cash dispenser in the same way as usual users. Because of the operation time of the cash dispenser in payment or the waiting time at the confusion caused by a large number of users, there results a drawback that payment of the cash to the user (precontractor) might be delayed or the service is not available to the user within the appointment time of the payment contract.

SUMMARY OF THE INVENTION

An object of the present invention is to provide a transaction processing system for a payment/deposit precontract in which the preparation of the payment/deposit is completed before the user comes to the shop to shorten the waiting time of the user.

A system according to the present invention includes means for accepting a precontract including the amount of payment/deposit and delivery time of payment/deposit, cash counting means for counting cash, a payment/deposit processing apparatus to be manipulated by the user at the time of payment/deposit on the basis of the precontract, delivery means for delivering a medium on the basis of the precontract, transfer means for transferring the medium for the payment/deposit precontract at least between the above described cash counting means and the delivery means, and control means for activating at least the above described cash counting means, payment/deposit processing apparatus, delivery means and transfer means on the basis of the precontract specification of the user. When a payment/deposit precontract from a user is received in such a system by using communication means such as a public telephone line or a data communication network, the priority of the precontract is determined together with a plurality of other precontracts already accepted but not prepared for payment yet on the basis of whether the user's appointment time is earlier or later, for example. For the case of a payment precontract, for example, the preparation for payment is completed by preparing the amount of payment and transaction statements on the delivery means on the basis of the priority.

When the payment precontract has been fixed, payment bills automatically counted by a bill counting control apparatus are stored together with a transaction statement into a receiving portion of the transfer means guided by wireless signals by using handling means disposed in the transfer means. Thereafter, the transfer means is moved to the position of an appointed storage portion of the delivery means, and the payment bills and the transaction statement are stored into the storage portion by using the handling means again, the preparation for payment being thus completed.

After information proper to the user who has come to the shop and the specification of the precontract are confirmed, the user can receive the payment bills and the transaction statement from a storage portion having the number of a predetermined location of the delivery means displayed on the payment/deposit processing apparatus.

BRIEF DESCRIPTION OF THE DRAWINGS

FIG. 5 is a sectional view showing the delivery of expendable goods such as treatment slip other than cash between the bill counting control apparatus and the mobile truck.

DESCRIPTION OF THE PREFERRED EMBODIMENTS

An embodiment of the present invention will now be described by referring to drawings.

Figure 1:
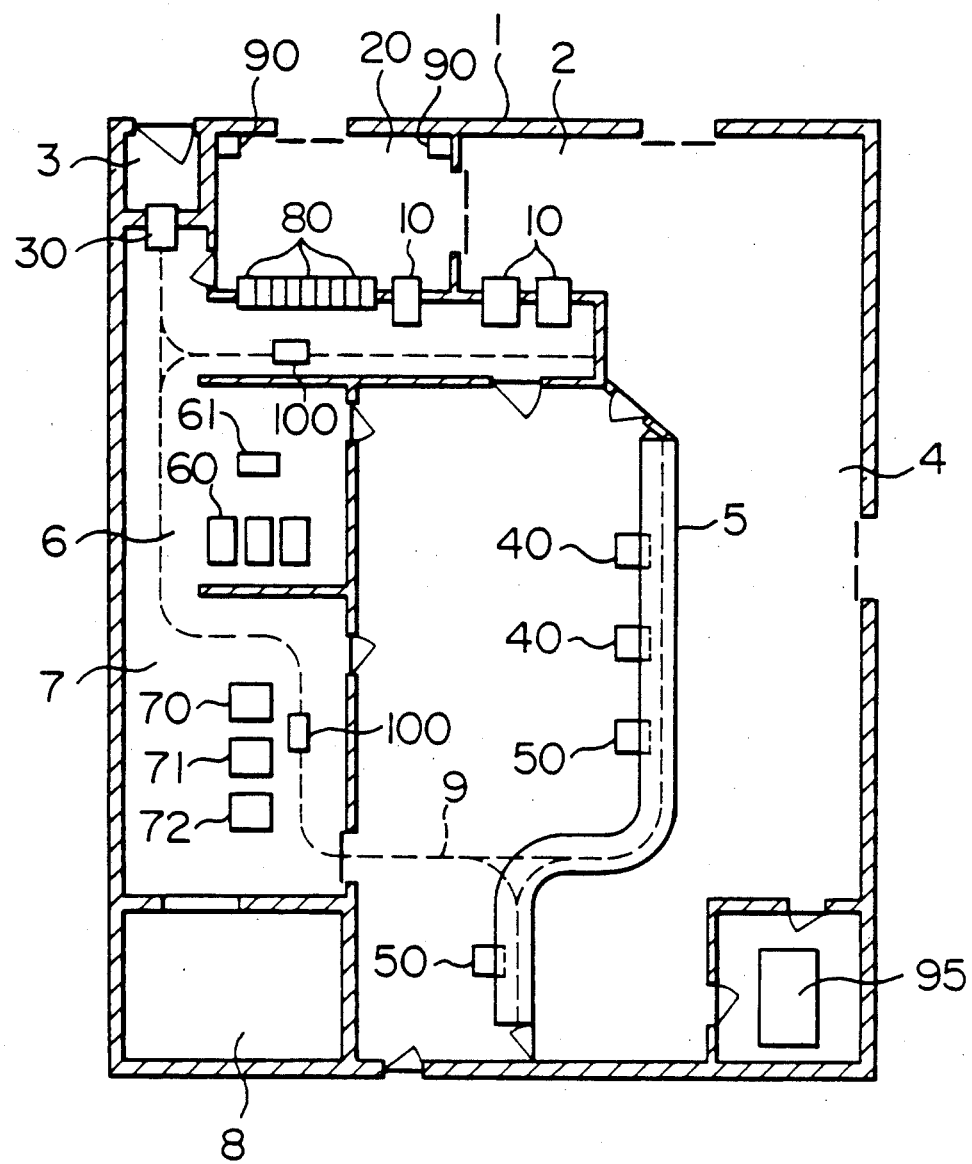
FIG. 1 shows an example of a layout of a business shop of a bank whereto an embodiment of the present invention has been applied.
Figure 2:
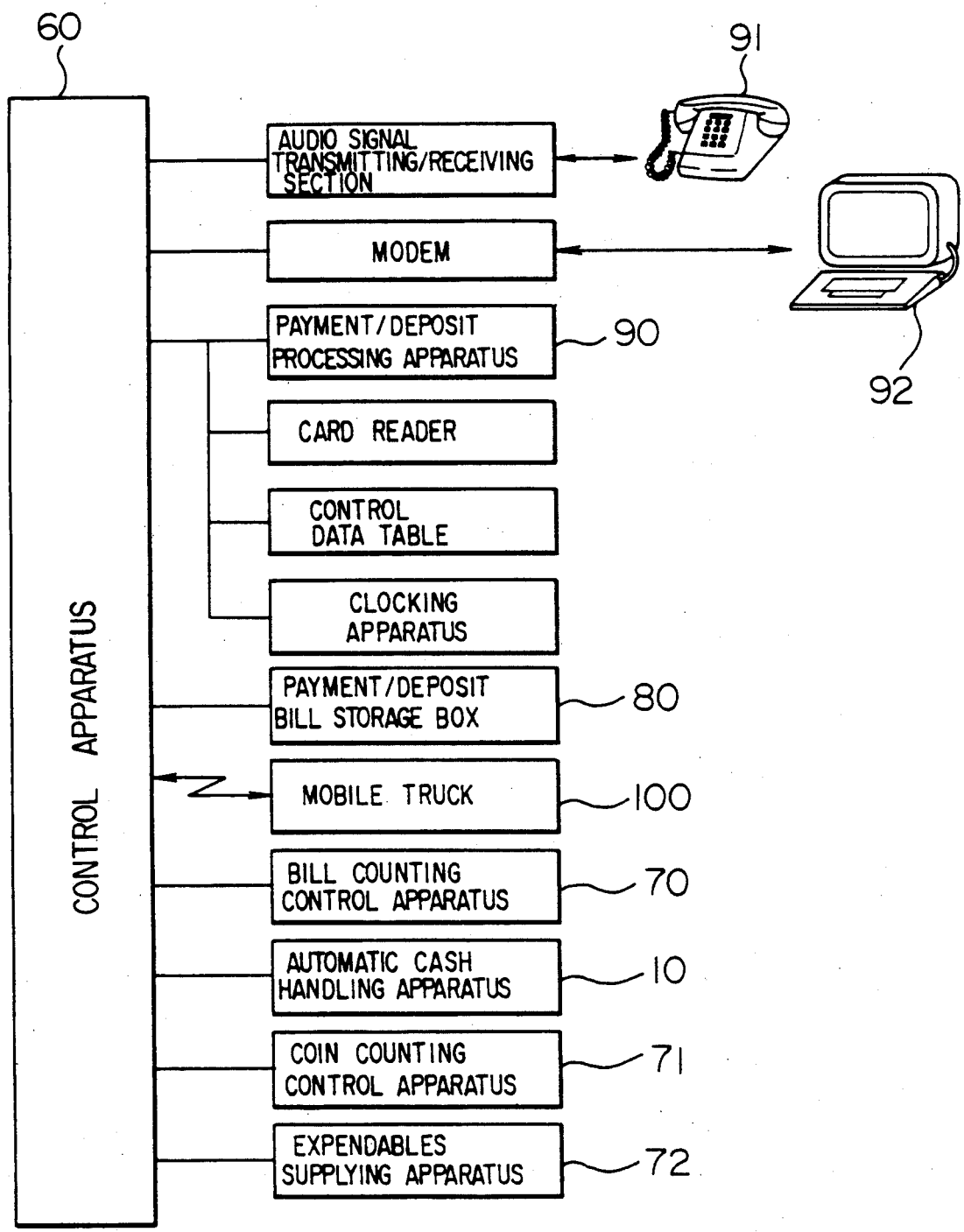
FIG. 2 is a block diagram showing the configuration of a primary portion of the present invention.

FIG. 1 shows an example of a layout of a business shop of a bank whereto an example of a system according to the present invention is applied. FIG. 2 is a block diagram showing the configuration of the primary part. In an illustrated business shop 1, cash corners 2 and 20 where various automatic machines such as automatic cash handling apparatuses 10 for performing cash payment and deposit, a cash corner 3 where an automatic cash handling apparatus 30 capable of providing cash transaction service for 24 hours, a lobby 4, a counter 5 including counter cash handling apparatuses 40 and a consultation corner terminal 50 disposed thereon, a centralized control room 6 including control apparatuses 60 and a control console 61 for controlling automatic apparatuses and information disposed therein, a taking-in and out master 7 including a bill counting control apparatus 70 for handling bills as cash counting means, a coin counting control apparatus 71 for handling coins and an expendables dispatching apparatus 72 disposed therein, and a vault 8 are disposed. A telephone set 91 and a terminal device 92 are connected to the above described control apparatus 60 via public telephone lines or a data communication network and are also controlled by the control apparatus 60.

A mobile truck 100 used as the transfer means has means for conveying cash, cash bonds such as goods other than cash and expendables such as transaction statement, printer ribbon, passbook and cash card and for automatically supplementing and retrieving them. The movable truck 100 can move in the shop in accordance with a guide path 9 disposed on the floor face.

The automatic cash handling apparatus 10 installed in the cash corner 2 is manipulated by a user who comes to the business shop. Further in the cash corner 20, storage boxes 80 used as the delivery means of cash bonds for payment/deposit by the payment/deposit precontractor and a payment/deposit processing apparatus 90 are disposed. And this cash corner 20 is used as a precontract transaction section.

Figure 3:
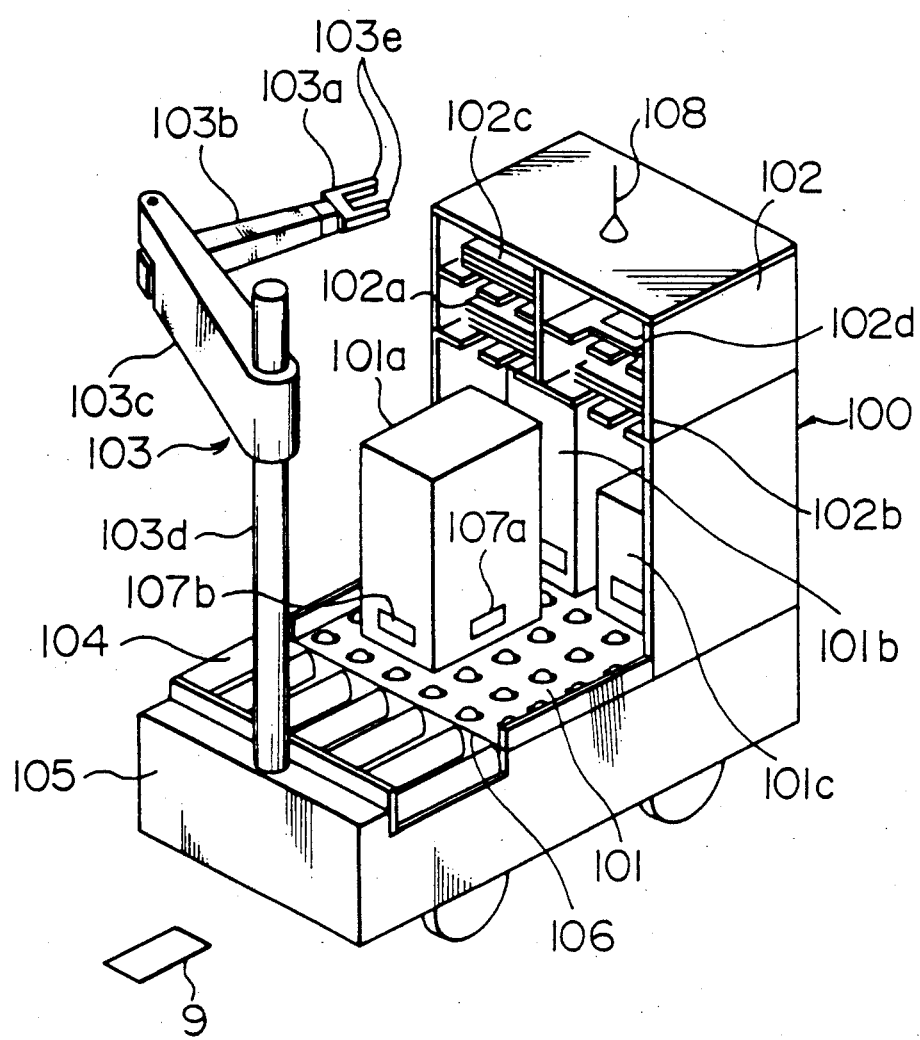
FIG. 3 is an exterior view showing an embodiment of a mobile shown in FIG. 1.

FIG. 3 shows an example of the movable truck 100 used for the present invention. In FIG. 3, the mobile truck 100 comprises a cassette storage portion 101 which can store a plurality of cassettes such as cassettes 101a, 101b and 101c receiving bills or coins, a spot storage portion 102 for aligning and storing spots other than cash including valuable securities such as bonds 102a, transaction statements 102b, passbooks 102c and remittance cards 102d, payment bills for payment contracts, transaction statements and deposit bills, handling means 103 including a hand 103a for grasping payment bills, their transaction statements, deposit bills or a spot other than cash, and members 103b, 103c and 103d for moving the hand 103a up and down while rotating the hand in a horizontal plane, a conveyor 104 for delivering a cassette such as the cassette 101a between the mobile truck 100 and an automatic apparatus such as the apparatus 10, and a truck portion 105 containing self-running means therein. The cassette storage portion 101 includes mobile means 106 such as ball conveyor mobile means which can freely move each cassette within the cassette storage portion 101 in the vertical direction and in the horizontal direction. Further, the conveyor 104 is movable in both the left and right directions with respect to the truck 105. Further, the truck 105 contains means for guiding and controlling the mobile truck 100 (which is not illustrated).

Each of the cassettes 101a, 101b and 101c includes members 107a and 107b which can adhere to magnetic adhesion means 103e disposed on the hand 103a.

Further, a radio antenna 108 is disposed as means for transmitting information to the mobile truck 100 and is controlled by the above described control apparatus 60.

Figure 4:
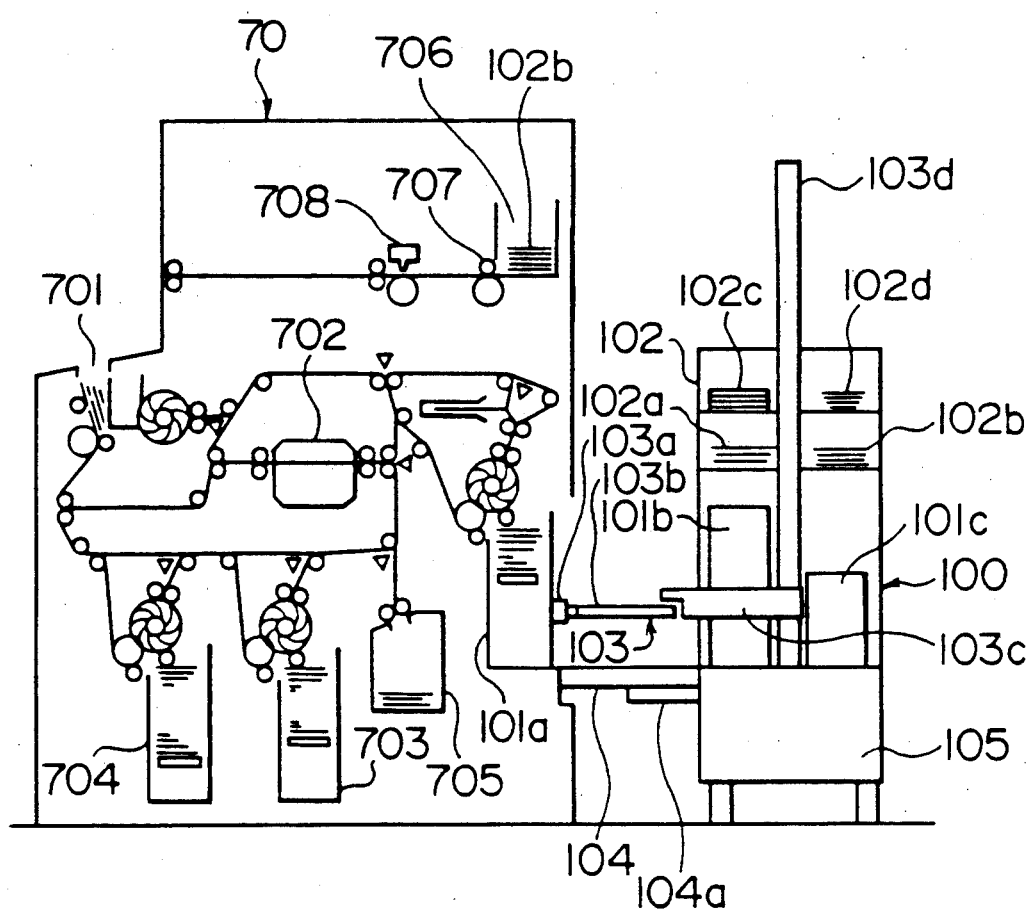
FIG. 4 is a sectional view showing the delivery of a cassette between a bill counting control apparatus and the mobile truck.
Figure 6:
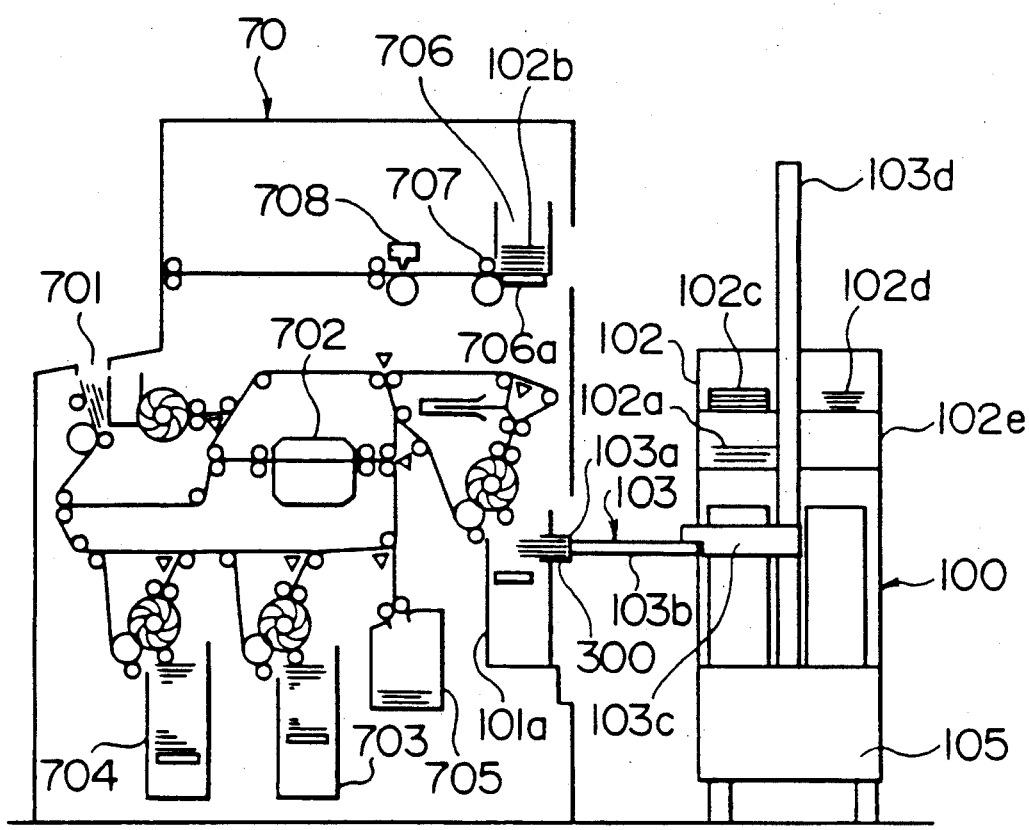
FIGS. 6 and 7 are sectional views showing the delivery of payment bills and transaction statements between the bill counting control apparatus and the mobile truck.
Figure 7:
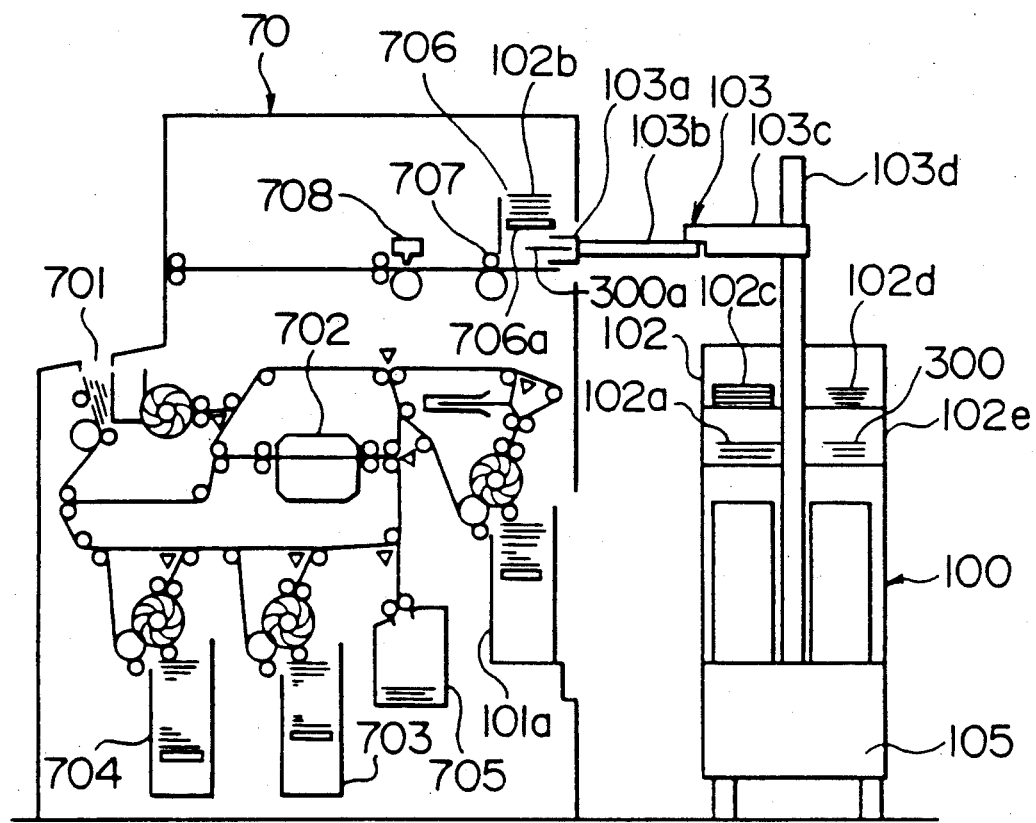

FIGS. 4 to 7 show examples of configuration of the bill counting control apparatus 70 in various operation modes. FIG. 4 is a configuration diagram showing an example of a delivery state of the cassette 100a containing bills or coins between the mobile truck 100 and the bill counting control apparatus 70. FIG. 5 is a configuration diagram showing a state in which treatment slips 102b are supplemented from the mobile truck 100. FIG. 6 is a configuration diagram showing a state in which payment precontract bills 300 are delivered. FIG. 7 is a configuration diagram showing a state in which a transaction statement 300a is delivered.

The bill counting control apparatus 70 includes a payment/deposit port 701 for a clerk in charge to deliver cash (although in this example the case of bills is shown, the case of coins is also handled in the same way), a bill checker portion 702 for checking whether the cash is genuine or not and whether the cash is damaged or not, recycle boxes 703 and 704 for storing payment bills, a reject box 705 for storing bills which are not used for payment, a bill handling portion including a cassette 101a for delivering bills, a transaction statements stack portion 706 for storing treatment slips 102b, a separation portion 707 for separating one by one the treatment slips 102b, a transaction statement dispatch portion including a printing portion 708, and a passbook handling portion. When the cassette 101a is to be delivered, the conveyor 104 from the truck 105 is laid between the bill counting control apparatus 70 and the truck 105 as shown in FIG. 4 in order to move the cassette 101a. The conveyor 104 is held by a slide rail 104a and can move in both sides of the truck.

When transaction statements 102b are to be supplemented from the mobile truck 100, transaction statements 102b stored in the spot storage portion 102 of the mobile truck 100 are grasped by the hand 103a of the handling means 103 and are set into the transaction statement stack portion 706.

Although the delivery of treatment slips has heretofore been described by referring to FIGS. 4 and 5, other valuable securities 102a and passbooks 102c can also be delivered in the same way.

The operation of supplementing and retrieving bills or coins by the cassette 101a and the operation of supplementing transaction statements 102b are also performed with respect to the automatic apparatuses such as an automatic cash handling apparatus 10 or an automatic cash handling apparatus with remittance function 30 in the same way. A storage shelf 102e of FIG. 5 is emptied beforehand in order to receive payment precontract bills.

When the payment precontract bills 300 are to be delivered from the bill counting control apparatus 70 to the mobile truck 100, the payment precontract bills 300 are received from the inside of the cassette 101a to the storage shelf 102e by manipulating the handling means 103 as shown in FIG. 6.

When a transaction statement 300a for payment precontract is to be delivered between the mobile truck 100 and the bill counting control apparatus 700, the treatment slip 300a is processed as described below and as shown in FIG. 7. That is to say, the transaction statement 300a located at the bottom of the treatment slip stack portion 706 is separated from the stack and conveyed by the separation portion 707 the printing portion for printing. Thereafter, a pressing board of the transaction statement stack portion is raised. The driving direction of the printing portion is reversed to deliver the transaction statement to the handling means 103 of the mobile truck 100 in the state shown in FIG. 7. The transaction statement is stored on the payment bills 30 of the storage shelf 102e.

Embodiments have heretofore been described with respect to the delivery of bills and transaction statements between the bill counting control apparatus 70 of the cash counting means and the mobile truck 100. Delivery between the coin counting control apparatus 31 and the mobile truck 100 is also performed in the same way.

Further, delivery between each of other automatic apparatuses installed in the business shop 1 and the mobile truck 100 is also performed in the same way.

Figure 8:
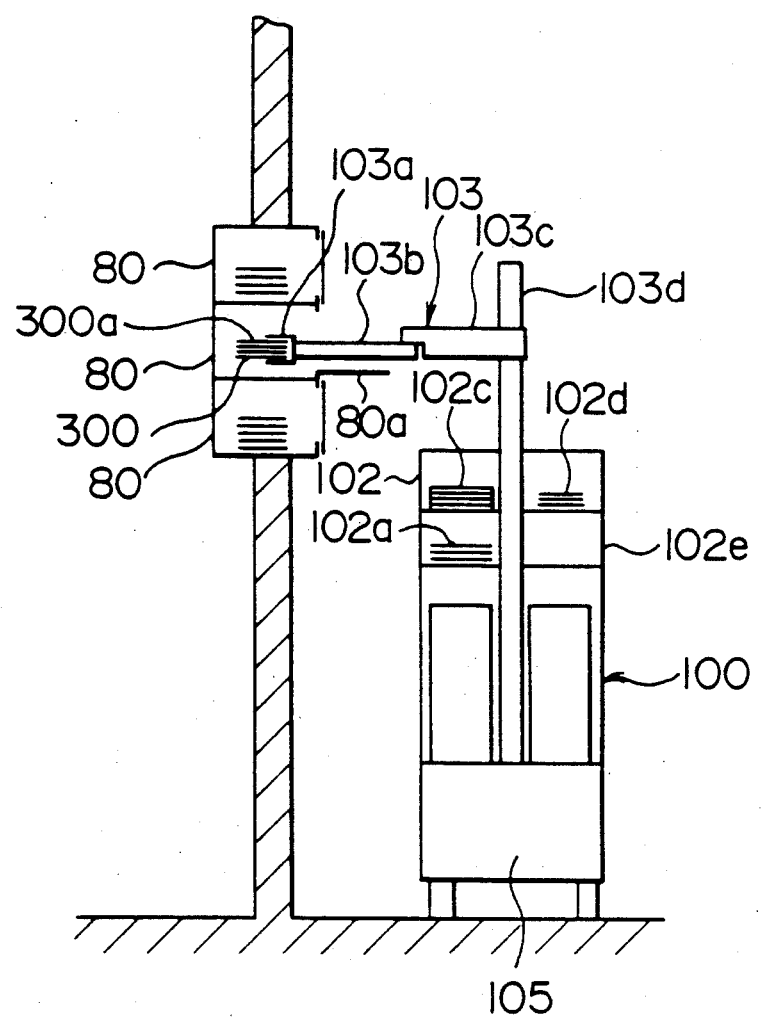
FIG. 8 is a sectional view showing the delivery of payment bills and the transaction statements between the storage box and the mobile truck.
Figure 9:
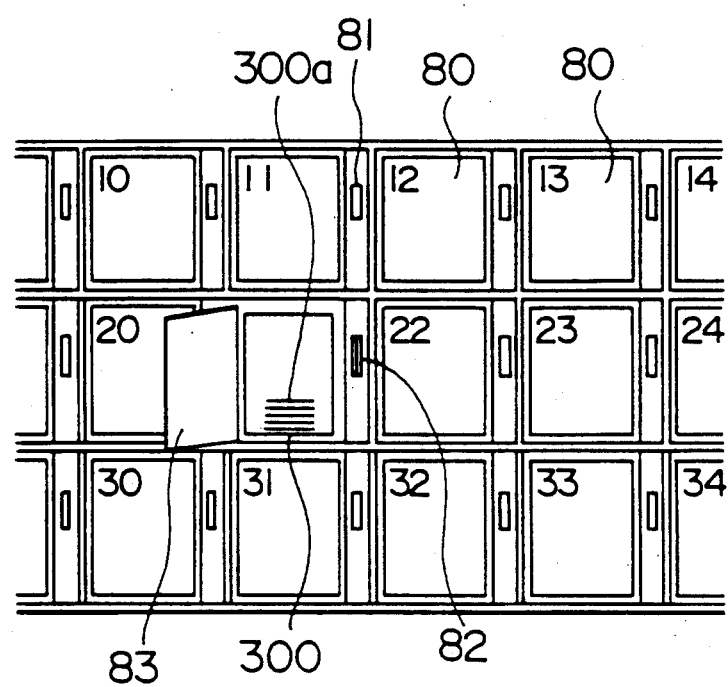
FIG. 9 shows an example of a storage box group.

FIG. 8 is a sectional view showing an example of a state in which the mobile truck 100 is guided by the guide path 9 shown in FIG. 9 to store the payment bills 300 and the transaction statements 300a into the storage box 80.

FIG. 9 shows an example of a group of the payment-/deposit storage boxes 80. On one side of each storage box 80 with respect to a partition wall, a door 83 opened and closed by a user is disposed. On the other side, an opening and closing portion opened when cash or the like is delivered by the above described mobile means 100 is disposed. When payment is precontracted, the user receives the appointment of a storage box ready for payment by a method described later. When the user slips an IC card, for example, into an aperture 81, a door 83 is opened and the user can receive the precontracted amount of cash and the treatment slip. On the other hand, the user deposite cash into the storage box 80 when precontracted to the effect. The activation source of the opening/closing operation is not restricted to an IC card. For example, a ten-key board may be disposed on each storage box 80 to be manipulated.

Figure 10A:
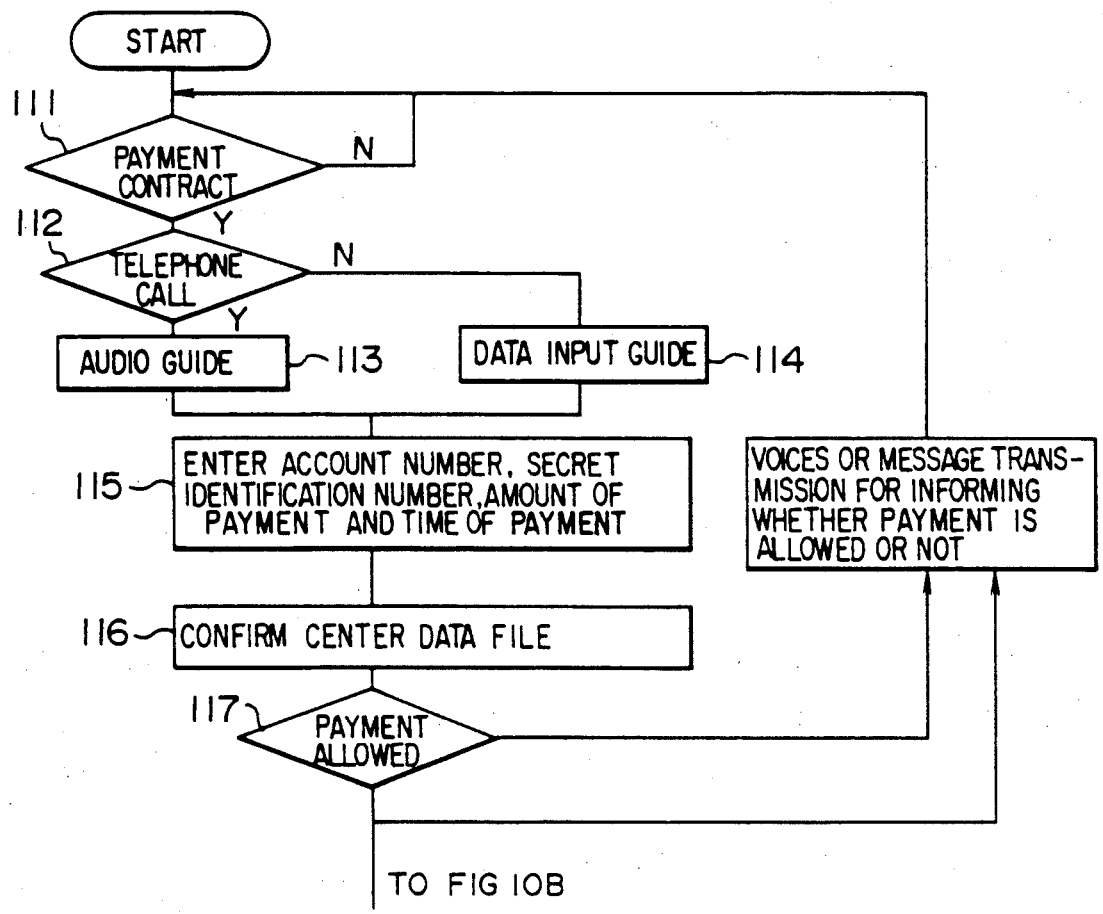
FIGS. 10 (a) and (b) are flow charts for illustrating the operation of the precontract payment according to the present invention.
Figure 10B:
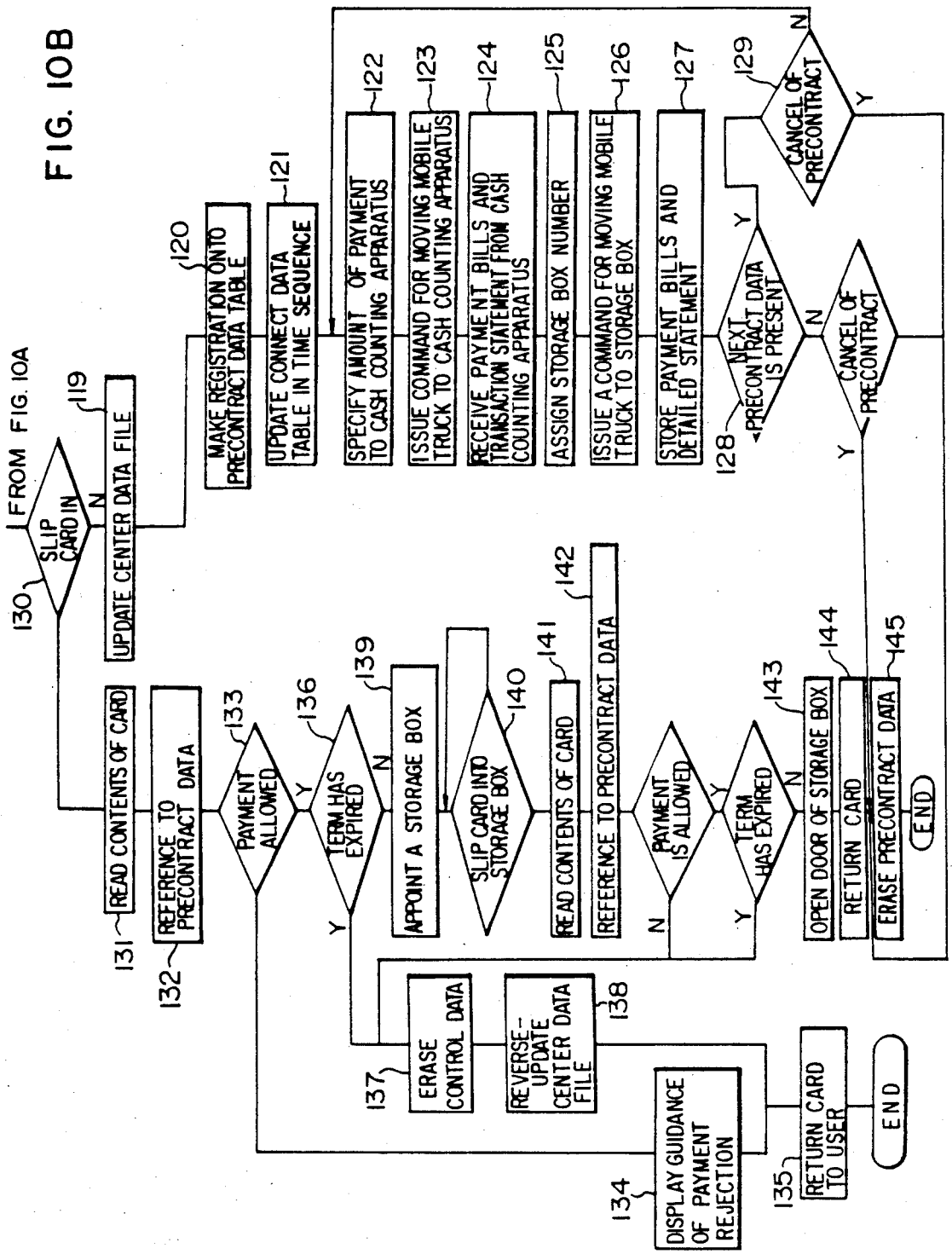

An example of the operation of the above described system according to the present invention will now be described by mainly referring to an operation flowchart shown in FIG. 10.

First of all, loading of each automatic apparatus with cash and goods other than cash performed as the preparation for the business start in the business shop 1. The bill counting control apparatus 70 and the coin counting control apparatus 71 are respectively loaded with bills and coins from the vault 8 by a clerk in charge and counted. Cassettes are thus loaded with bills and coins. These commands are despatched from the control apparatus 60 installed in the centralized control room 6 to control the movement of the mobile truck 100 via the antenna 108 disposed on the mobile truck 100. Cash and goods other than cash are supplemented and retrieved in the same way as the bill counting control apparatus 70 and will not be described in detail. Cassettes loaded with cash are conveyed to the mobile truck 100 to make preparation for the transportation of cassettes to automatic apparatuses of respective portions in the business shop 1. Goods other than cash stored in the expendables supplying apparatus 72 are aligned and stored in the spot storage portion 102 by handling means 103 provided on the mobile truck 100.

The case of a payment precontract will now be described.

First of all, the user judges whether the precontract is a payment precontract (Step 111), If the answer is yes, the user uses the telephone set 91 or the terminal device 92 (Step 112). By using either an audio guide (Step 113) or a data input guide (Step 114) of a business shop to be used via a public telephone line or a data communication network, the user enters the account number, the secret identification number, the amount of payment and the desired time of payment (Step 115) to make a payment precontract.

In the business shop, the input data of this user are referred to (Step 116), and it is judged whether the payment precontract is allowed or not (Step 117). If the payment precontract is not allowed, it is communicated to the user by voices in case of the telephone set and by message transmission in case of the terminal device (Step 118). If the payment precontract is allowed, it is communicated at step 118. Together with this communication, the senter data file is updated (Step 119). The rough time of visit of the user to the shop is registered onto a precontract data table (Step 120). The precontract data table is updated in time series (Step 121). The control apparatus 60 determines the priority of the payment preparation operation on the basis of the appoint time of the visit of the user to the business shop when a number of payment precontracts are accepted.

In accordance with the priority, the control apparatus 60 despatches a payment preparation command to the bill counting control apparatus 70 and the mobile truck 100. On the basis of the specified amount of payment, the bill counting control apparatus 70 makes preparations for payment (Step 122). Further, the mobile truck 100 ensures the storage space 102e for payment bills and moves to the position as illustrated in FIG. 6 to receive the payment bills and the transaction statement from the bill counting control apparatus 70 (Step 123). The bill counting control apparatus 70 stores the specified amount of money into the bill handling portion including the cassette 101a and dispatches the transaction statement as described before. Thereafter, the mobile truck 100 receives the payment bills 300 and the transaction statement 300a from the bill counting control apparatus 70 and stores them into the storage box 102e as shown in FIGS. 6 and 7 (Step 124). The control apparatus 60 then dispatches a command for appointment of a payment bill storage box 80 (Step 125) and a movement to the mobile truck 100 (Step 126). The mobile truck 100 moves to the rear face of a payment bill storage box 80 of FIG. 1 via the guide path 9 and stores the payment bills 300 and the treatment slip 300a into the appointed storage box as shown in FIG. 7 (Step 127) the preparation for payment being thus completed. Succeedingly, it is judged whether the next precontract input is present or not (Step 128). It is then judged whether the input is a new precontract or cancel of a precontract already accepted (Step 129). In case of a new precontract, preparations for payment are made on the basis of the precontract data at step 122 and succeeding steps. In case of precontract cancel, the precontract data are erased, and suitable means (not shown) are activated to return bills stored in the storage box to the bill counting control apparatus.

The procedure required for the user to receive the payment bills at the shop will now be described. The user comes to the shop the precontracted time and slips an IC card into a payment/deposit processing apparatus 90 shown in FIG. 1 (Step 130). Both the payment-/deposit processing apparatus 90 and payment/deposit precontract box 80 are controlled by the control apparatus 60. The payment/deposit processing apparatus 90 references to information despatched from the control apparatus 60 with information contained in the IC card of the user (Step 131). After the specification of the payment precontract has been confirmed (Step 132), it is judged whether the payment is to be allowed or not (Step 133). When the payment is not allowed, a guidance of payment rejection is displayed on the payment-/deposit processing apparatus 90, for example (Step 134) and the card is returned to the user (Step 135). When the payment is allowed, it is judged whether the term of the precontract has expired or not (Step 136). When the term of the precontract has expired, the precontract data are erased (Step 137), the center data file is reverse-updated (Step 138), and the card is returned to the user (Step 135). When the term of the precontract has not expired, the payment bill storage box number, say 21 shown in FIG. 9 is displayed on a display portion of the payment/deposit processing apparatus 90 or another display device (which is not illustrated) (Step 139). Thereafter, the user pulls out the IC card from the payment processing apparatus as shown in FIG. 8 and slips the IC card 82 into the card aperture 81 of the appointed storage box (21 in this example) among the payment/deposit bill storage boxes (Step 140). The information despatched from the control apparatus 60 is referred to the precontract data information of the IC card again (Steps 141 and 142). Only when the term has not expired under the condition that the information agreement is found and the payment is allowed, the door 83 of the storage box 80 is opened by a command despatched from the control apparatus 60 (Step 143). The user receives the payment bills 300 and the treatment slip 300a and pulls out the IC card. When the card is thus returned (Step 144), the door 83 of the storage box 80 is automatically closed, the payment/deposit precontract being thus completed. When the payment precontract operation has been completed, the data of the precontract are erased (Step 145).

If payment is not performed when a predetermined time has elapsed from the appoint time of the visit of the user to the shop specified by the user at the precontract or when a predetermined time has elapsed from the display of the payment/deposit bill storage box number at the payment/deposit processing apparatus 90 (i.e., if the term of the above described precontract has expired), the precontract is automatically cancelled by the control apparatus 60. In this case, the bills and the transaction statement are returned to the bill counting control apparatus 70 by the mobile truck 100 in accordance with operation opposite to that of payment preparation. And the bills are returned to the recycle box 703 or 704, and the treatment slip is received into the reject box 705.

In a system introduced in accordance with the present invention as described above, the payment processing which is noticeably higher than the deposit processing in frequency is precontracted by using a public telephone line or a data communication network. Accordingly, the waiting time of the user is reduced near to zero, resulting in improved service.

Since the amount of payment is fixed, highly efficient investment of the minimum funds becomes possible. For shortening the waiting time of the user in the conventional countermeasure, a number of expensive automatic multi-function high-speed processing apparatuses must be introduced. When users are few, therefore, both the automatic apparatuses and funds are unadvantageously wasted. In accordance with the present invention, however, this problem can be solved by providing payment/deposit bill storage boxes. Accordingly, the amount of investment of banking facilities can be reduced, and the installation space can also be saved because of the use of the wall face. Further, the frequency of the payment processing in the automatic cash handling apparatus 10 according to the present invention becomes extremely low. Therefore, the automatic cash handling apparatus 10 need not be multi-function type capable of supplementing and retrieving bills, but may comprise one conventional automatic depositor and one conventional automated cash dispenser. In this aspect as well, therefore, the amount of investment of banking facilities can be reduced.

In the present embodiment, the payment precontract system of only bills has been described. However, the payment precontract system is not restricted to bills, but the precontract of coins and issue of bonds such as valuable securities is also possible.

In case of a deposit precontract, the user puts precontracted deposit bills, for example, into a storage box specified in the same way as the above described payment precontract at the appointed time. At this time as well, the payment/deposit processing apparatus 90 and the storage box 80 read data based upon the deposit precontract from the IC card of the user, for example. On the basis of the data thus read, respective apparatuses are activated by commands despatched from the control apparatus 60 in the same way as the payment precontract. The precontracted deposit work is thus performed.

In a payment/deposit precontract according to the present invention, preparations for the payment/deposit can be completed until the user comes to the shop. As a result, the waiting time of the user can be greatly shortened.

We claim:

1. A transaction processing system comprising:
   first means for receiving precontract data relating to a precontract of a financial transaction, said precontract data being transmitted from a customer and including at least a time schedule when the customer intends to carry out the precontract and information relating to the customer and the transaction, judging whether the precontract is allowable and registering the precontract data when it is judged that the precontract is allowable;
   second means for permitting a customer to input data including at least information identifying the customer;
   means including a plurality of delivering/receiving units, each adapted for delivering to or receiving from any customer medium of the financial transaction;
   third means for comparing the precontract data registered in said first means with the data inputted by the customer through said second means when said data is inputted at a time corresponding to said schedule time, and selecting one of said delivering/receiving units when said inputted data agrees with said precontract data so that the customer is allowed to use said one delivering/receiving unit for delivering to or receiving from the customer the medium of the financial transaction based on the precontract.

2. A transaction processing system according to claim 1, wherein said precontract data is transmitted from the customer through a public telephone line of a data communication network.

3. A transaction processing system according to claim 1, wherein each of said delivering/receiving units includes a door which is opened based on the comparison between the precontract data and customer data inputted thereto by the customer.

4. A transaction processing method comprising the steps of:
   receiving a precontract of a financial transaction based on precontract data transmitted from a customer through a public telephone line or a data communication network, said precontract data including a deposit account number, a secret identification number of an ID card of the customer, an amount of money for the transaction and a time schedule when the customer intends to carry out the precontract;

judging whether the precontract is allowable and registering the precontract data when it is judged that the precontract is allowable;

comparing registered precontract data with inputted customer data, when the customer inputs customer data identifying the customer;

specifying a selected storage portion in a delivering-/receiving section when said precontract data agrees with said customer data, said selected storage portion being normally closed and having means for receiving the ID card and comparing the secret identification number of the ID card with that included in said precontract data;

allowing the customer to open the selected storage portion thereby carrying out the financial transaction based on the precontract when said secret identification number of the ID card agrees with that included in said precontract data.

5. A method according to claim 4, wherein said registered precontract is automatically cancelled when said customer fails to carry out the precontract in a predetermined time interval after the scheduled time included in said precontract data.

6. A method according to claim 4, wherein said registered precontract is automatically cancelled when said customer fails to carry out the precontract in a predetermined time interval after the selected storage portion is specified.

* * * * *